United States Patent
Oguri

(10) Patent No.: US 10,707,064 B2
(45) Date of Patent: Jul. 7, 2020

(54) MASS SPECTROMETER, MASS SPECTROMETRY METHOD AND PROGRAM FOR MASS SPECTROMETRY

(71) Applicant: SHIMADZU CORPORATION, Kyoto-shi, Kyoto (JP)

(72) Inventor: Masateru Oguri, Kyoto (JP)

(73) Assignee: SHIMADZU CORPORATION, Kyoto-shi, Kyoto (JP)

(*) Notice: Subject to any disclaimer, the term of this patent is extended or adjusted under 35 U.S.C. 154(b) by 243 days.

(21) Appl. No.: 15/760,082

(22) PCT Filed: Sep. 15, 2015

(86) PCT No.: PCT/JP2015/076130
§ 371 (c)(1),
(2) Date: Aug. 21, 2018

(87) PCT Pub. No.: WO2017/046867
PCT Pub. Date: Mar. 23, 2017

(65) Prior Publication Data
US 2018/0366308 A1 Dec. 20, 2018

(51) Int. Cl.
*H01J 49/00* (2006.01)
*G01N 27/62* (2006.01)
*G01N 30/72* (2006.01)

(52) U.S. Cl.
CPC .......... *H01J 49/0036* (2013.01); *G01N 27/62* (2013.01); *G01N 30/72* (2013.01); *H01J 49/0045* (2013.01); *H01J 49/0077* (2013.01)

(58) Field of Classification Search
CPC ........ H01J 49/00; H01J 49/02; H01J 49/0027; H01J 49/0031; H01J 49/0036; H01J 49/022; H01J 49/26

(Continued)

(56) References Cited

U.S. PATENT DOCUMENTS

2017/0287691 A1* 10/2017 Asano ................. H01J 49/0031

FOREIGN PATENT DOCUMENTS

| JP | 2012-104389 A | 5/2012 |
| JP | 2013-015485 A | 1/2013 |

OTHER PUBLICATIONS

Written Opinion of the International Search Authority of PCT/JP2015/076130 dated Dec. 15, 2015 [PCT/ISA/237].

(Continued)

*Primary Examiner* — Jason L McCormack
(74) *Attorney, Agent, or Firm* — Sughrue Mion, PLLC

(57) ABSTRACT

Provided is a mass spectrometer including a storage section in which an MRM measurement condition specifying an MRM transition and an execution time slot is stored for target compounds; an applied-voltage candidate value determiner for determining applied-voltage candidate values for each of the MRM transitions; a preliminary measurement number determiner for determining the number of times a preliminary measurement is performed to optimize an applied-voltage value in the plurality of MRM transitions; a unit measurement divider for dividing a plurality of unit measurements which correspond to all combinations of the MRM transitions and the applied-voltage values into the same number of groups as the number of times of the preliminary measurement, in such a manner as to minimize the number of overlaps of execution times; and a preliminary measurement execution file creator for creating a preliminary measurement execution file for each group.

16 Claims, 10 Drawing Sheets

(58) Field of Classification Search
USPC .................................. 250/281, 282, 288
See application file for complete search history.

(56) References Cited

OTHER PUBLICATIONS

University of Washington, "Skyline Targeted Proteomics Environment", [online], [accessed on Jan. 26, 2015], the Internet.

* cited by examiner

Fig. 1

| Event Name | Target Compound | MRM Transition | | | Execution Time (min.) | CE Value |
|---|---|---|---|---|---|---|
| | | Precursor Ion | | Product Ion | | |
| Event 1 | Compound A | A1 | > | a1 | 0.0-3.0 | Preset value |
| Event 2 | Compound A | A2 | > | a2 | 0.0-3.0 | Preset value |
| Event 3 | Compound B | B1 | > | b1 | 2.0-6.0 | Preset value |
| ... | ... | ... | | ... | ... | ... |
| Event 91 | Compound Δ | Δ1 | > | δ1' | 23.0-27.0 | Preset value |
| ... | ... | ... | | ... | ... | ... |
| Event 100 | Compound X | X2 | > | x2 | 26.0-30.0 | Preset value |

Fig. 2

CHILD METHOD 1

| Event Name | Target Compound | MRM Transition | | | Execution Time (min.) | CE Value |
|---|---|---|---|---|---|---|
| | | Precursor Ion | | Product Ion | | |
| Event 1-1 | Compound A | A1 | > | a1 | 0.0-3.0 | 5V |
| Event 1-2 | Compound A | A1 | > | a1 | 0.0-3.0 | 10V |
| ... | ... | ... | | ... | ... | ... |
| Event 1-12 | Compound A | A1 | > | a1 | 0.0-3.0 | 60V |
| Event 1-13 | Compound A | A2 | > | a2 | 0.0-3.0 | 5V |
| ... | ... | ... | | ... | ... | ... |
| Event 1-120 | Compound E | E2 | > | e2 | 2.5-7.0 | 60V |

.
.
.

CHILD METHOD 10

| Event Name | Target Compound | MRM Transition | | | Execution Time (min.) | CE Value |
|---|---|---|---|---|---|---|
| | | Precursor Ion | | Product Ion | | |
| Event 10-1 | Compound Δ | Δ1 | > | δ1' | 23.0-27.0 | 5V |
| ... | ... | ... | | ... | ... | ... |
| Event 10-120 | Compound X | X2 | > | x2 | 26.0-30.0 | 60V |

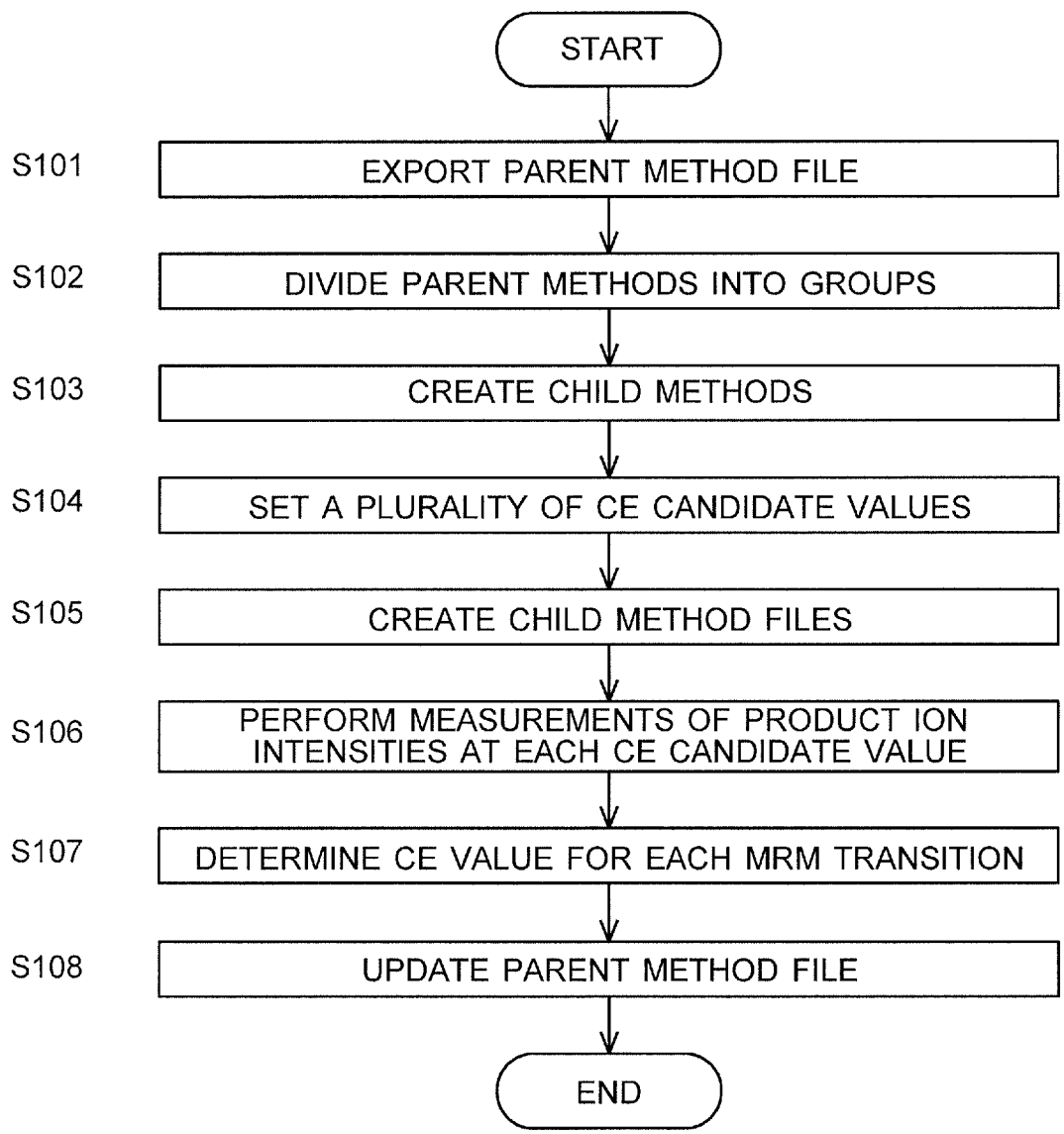

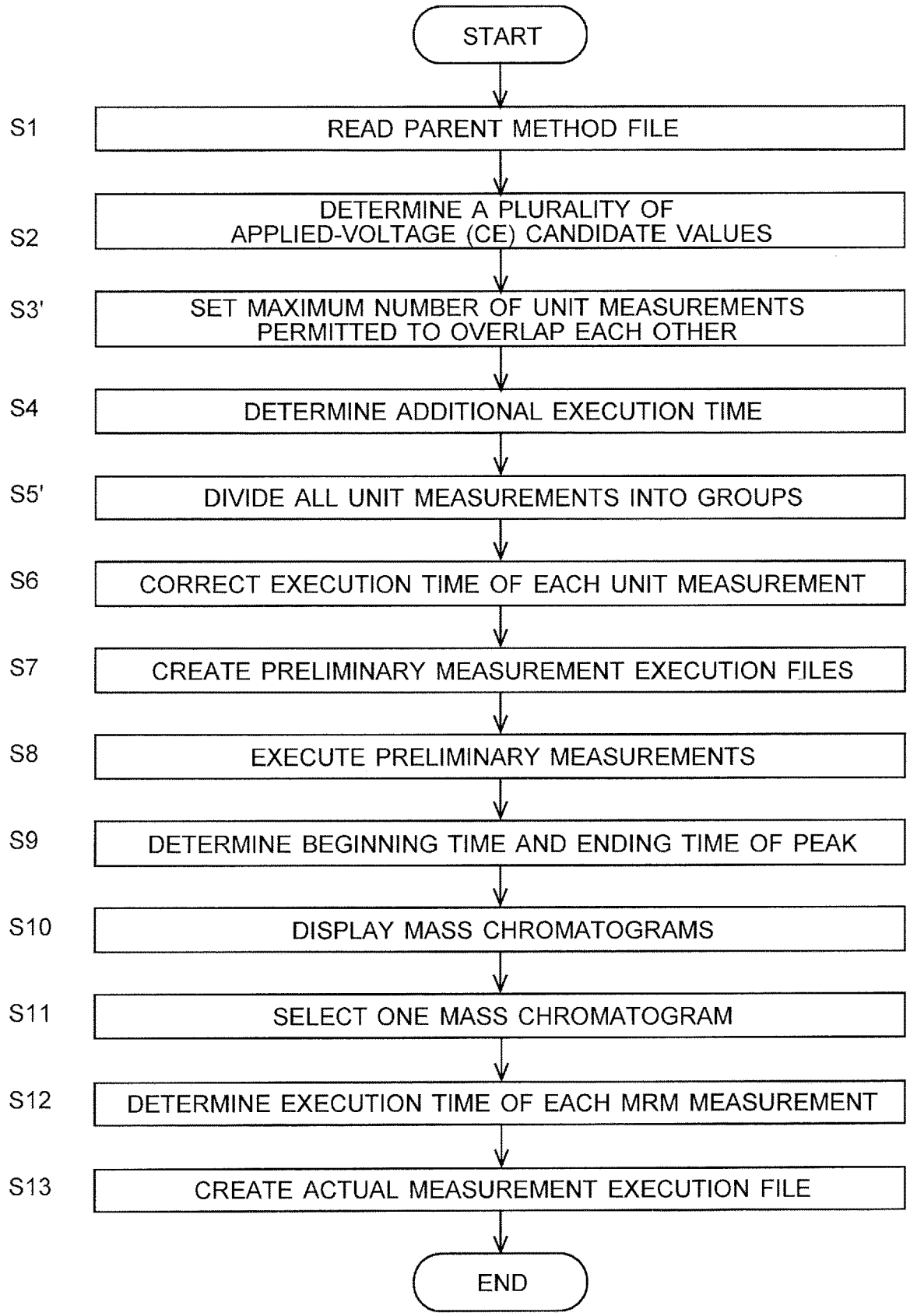

MASS SPECTROMETER, MASS SPECTROMETRY METHOD AND PROGRAM FOR MASS SPECTROMETRY

CROSS REFERENCE TO RELATED APPLICATIONS

This application is a National Stage of International Application No. PCT/JP2015/076130, filed Sep. 15, 2015.

TECHNICAL FIELD

The present invention relates to a mass spectrometer for analyzing a plurality of target compounds separated from each other by a chromatograph, and particularly, to a mass spectrometry method as well as a program for mass spectrometry used for optimizing the conditions of a multiple reaction monitoring (MRM) measurement.

BACKGROUND ART

A technique called the "MS/MS analysis (tandem analysis)" is known as a mass spectrometric technique used for identifying or quantifying a target component contained in a sample. For example, the MS/MS analysis is performed using a mass spectrometer (such as a tandem quadrupole mass spectrometer) including: a front mass separator section for selecting a precursor ion; a fragmenting section, such as a collision cell, for fragmenting the precursor ion into product ions; and a rear mass separator section for selecting a product ion.

An MRM measurement is one mode of the measurement in the MS/MS analysis. In the MRM measurement, the mass-to-charge ratio at which an ion is allowed to pass through is fixed in each of the front and rear mass separator sections to measure the intensity of a specific product ion for a specific precursor ion. Such a combination of the precursor ion and product ion is called the "MRM transition". In the MRM measurement, the front and rear mass separator sections remove ions originating from compounds which are not measurement targets, ions originating from foreign substances, as well as neutral particles which have not been ionized. Therefore, ion intensity signals with a high signal-to-noise (SN) ratio can be obtained.

Due to such merits, the MRM measurement has been used for an analysis of a sample containing a plurality of target compounds, such as a sample collected from soil or sample of biological origin. For an analysis of a sample containing a plurality of target compounds, a chromatograph mass spectrometer which includes a chromatogram (gas chromatograph or liquid chromatograph) combined with a mass spectrometer having the previously described configuration is used. The plurality of target components contained in the sample are temporally separated from each other by a column in the chromatograph and introduced into the mass spectrometer, to be individually subjected to an MRM measurement.

In an MRM measurement in a chromatograph mass spectrometer, an analysis operator determines the contents (method) of a series of measurements on mass spectrometry software by entering, for each of the target compounds, one or more MRM transitions which correspond to the target compound as well as a time segment during which an MRM measurement using each of those MRM transitions is executed. The analysis operator prepares a measurement execution file (method file) in which the entered contents are described. The analysis operator also gives a name for identifying the measurement condition (event name) to each individual measurement condition (i.e. the combination of an MRM transition and an execution time). FIG. 1 shows an example of the method in the case of performing a measurement for 50 kinds of target compounds using two MRM transitions for each compound.

The form of fragmentation of a precursor ion varies depending on the magnitude of the fragmentation energy. In the method file mentioned earlier, the magnitude of the ion fragmentation energy in the fragmenting section is set at a previously determined value (preset value); the fragmentation energy is not set for each of the set MRM transitions at a value which yields the highest sensitivity for the detection of the product ion. Therefore, it is necessary to optimize the magnitude of the fragmentation energy for each MRM transition in order to perform a measurement of each target compound with high sensitivity (for example, see Patent Literature 1 or 2). In the case where the fragmenting section is a collision cell, the fragmentation energy is normally called the "collision energy (CE)".

If a standard sample of the target component in the form of a pure substance is available, the CE value which yields the highest sensitivity for the detection of the product ion can be determined by directly introducing the standard sample into the mass spectrometer and sequentially changing the CE value. However, it is difficult to obtain a standard sample for a target compound contained in a sample collected from soil or a sample of biological origin. In such a case, the CE value is optimized by a procedure as shown in FIG. 3 using a chromatograph mass spectrometer.

Initially, a method file prepared on the mass spectrometry software in the previously described manner (this file is hereinafter called the "parent method file") is exported to a file in a specified format, such as the csv format (Step S101). This file is subsequently read by an appropriate software application, such as a spreadsheet. The method described in the parent method file (this method is hereinafter called the "parent method") includes measurements to be performed using the MRM transitions individually (these measurements are hereinafter called "parent events"). Those measurements are divided into groups (Step S102), and a method which corresponds to one group (this method is hereinafter called the "child method") is prepared for each group (Step S103).

Subsequently, in each of the child methods, a plurality of different CE candidate values are set for each MRM transition (Step S104), and a plurality of events which respectively correspond to the combinations of the MRM transition and CE candidate values (these events are hereinafter called "child events") are created. The child methods which have been updated through the creation of the child events are saved to a file in an appropriate format, e.g. csv, and then imported from the file into the mass spectrometry software to create a child method file (Step S105). FIG. 2 shows an example of the child events created from the method shown in FIG. 1. All parent events are divided into groups of ten parent events. Ten child methods corresponding to those groups are created. In each child method, a total of 12 child events are created for each MRM transition, with the CE candidate value set at 12 levels ranging from 5V to 60V at intervals of 5V.

While the sample is introduced into the chromatograph, one of the child methods is executed, and the intensity of the product ion is measured at each of the different CE candidate values for each MRM transition described in the child method (Step S106). Subsequently, for each MRM transition, the analysis operator checks the measured result and selects one CE candidate value at which the product ion has been detected with the highest sensitivity. This CE candidate value is determined as the CE value for the MRM transition concerned (Step S107).

After all child method files have been executed and the CE values for all MRM transitions have been determined, those CE values are written in the parent method file, and this file is updated (Step S108).

In the conventional method described thus far, the analysis operator needs to manually perform the tasks of exporting the parent method file, dividing the parent method (creation of child methods), entering the plurality of CE values (creation of child events), updating the child methods, and importing the updated data into the mass spectrometry software (creation of child method files). Those tasks require a considerable amount of time and labor.

To reduce the amount of work by the analysis operator, software applications have been proposed which can automatically create child method files by extracting parent methods in batches of a predetermined number from a parent method file in the described order (for example, see Non Patent Literature 1).

CITATION LIST

Patent Literature

Patent Literature 1: JP 2013-15485 A
Patent Literature 2: JP 2012-104389 A

Non Patent Literature

Non Patent Literature 1: University of Washington, "Skyline Targeted Proteomics Environment", [online], [accessed on Jan. 26, 2015], the Internet

SUMMARY OF INVENTION

Technical Problem

In the case where a plurality of child methods are created from one parent method in which a plurality of measurements (parent events) each of which uses one or more MRM transitions are respectively set for a plurality of target compounds, and a child method file is created for each child method, it is normally the case that parent events for different target compounds have different execution times. However, the software described in Non Patent Literature 1 extracts parent methods mechanically (e.g. in the described order in the parent method file), without considering the execution time of each parent event, to create child methods. Therefore, if a plurality of CE candidate values are set in each child method to create child events, the execution times of a large number of child events may overlap each other.

Consider the case where a plurality of child events overlap each other within time segment "A". Those child events are executed as follows: One of the child events is executed one time. After this first event has been completed, another child event is executed. After all child events have been individually executed one time, the operation of executing each child event one time is performed once again starting from the first event. Such an operation in which all child events are individually executed one time is repeated until the end of the time segment "A". The period of time required for all child events to be individually executed one time is called the "loop time". The loop time corresponds to the interval of time at which data of each individual child event are acquired.

If the execution times of a large number of child events overlap each other, the loop time becomes long, and the interval of time at which data of each individual child event are acquired also becomes long. This means a decrease in the number of points of data acquired during the period of time in which one of the target compounds separated by the chromatograph is being introduced into the mass spectrometer. Consequently, the peak on each mass chromatogram needs to be represented by an insufficient number of data points, which lowers the accuracy of the mass chromatogram. The loop time can be shortened by setting a shorter period of time for one execution of the child event. However, in that case, the accuracy of each measurement becomes lower, which also lowers the accuracy of the mass chromatogram.

The description thus far has been concerned with the case of optimizing the value of the collision energy, which is a representative parameter in the MRM measurement. Similar problems can also occur in the case of optimizing other parameters in the MRM measurement (e.g. the magnitude of a voltage applied to the front or rear mass separator section).

The problem to be solved by the present invention is to provide a mass spectrometer, mass spectrometry method and program for mass spectrometry which make it possible to easily create a preliminary measurement execution file used for performing a preliminary measurement for optimizing the value of a voltage applied to respective sections of a mass spectrometer for each of a plurality of MRM measurements each of which has a previously specified execution time slot and a previously specified MRM transition, which is the combination of a precursor ion and a product ion, as well as to acquire mass chromatograms with high accuracy by executing the file.

Solution To Problem

The first aspect of the present invention developed for solving the previously described problem is a mass spectrometer having the function of optimizing a condition of a multiple reaction monitoring measurement performed for each of a plurality of target compounds separated from each other by a chromatograph, the mass spectrometer including:

a) a storage section in which at least one MRM measurement condition is stored for each of the plurality of target compounds, the MRM measurement condition specifying an MRM transition which is a combination of a precursor ion and a product ion as well as an execution time slot in which a measurement using the MRM transition is executed within the entire measurement time;

b) an applied-voltage candidate value determiner for determining a plurality of applied-voltage candidate values for each of the plurality of MRM transitions, based on an input by an analysis operator;

c) a preliminary measurement number determiner for determining the number of times of a preliminary measurement to optimize an applied-voltage value in the plurality of MRM transitions, based on an input by an analysis operator, where the number of times is equal to or more than two;

d) a unit measurement divider for dividing a plurality of unit measurements which individually correspond to all combinations of the plurality of MRM transitions and the plurality of applied-voltage candidate values into the same number of groups as the number of times of the preliminary measurement, where the unit measurement divider divides all unit measurements into the groups in such a manner as to minimize the largest value of the number of overlaps of execution times in each group; and e) a preliminary measurement execution file creator for creating a preliminary measurement execution file for each of the plurality of groups.

The applied-voltage value mentioned earlier is the magnitude of a voltage to be applied to respective sections of the mass spectrometer. Among others, it means the magnitude of a voltage which affects the efficiency of the passage or generation of a precursor ion and/or product ion. For example, the applied-voltage value is the value of a collision energy applied to the collision cell, the value of a bias voltage applied to the front mass separator section, or the value of a bias voltage applied to the rear mass separator section. The applied-voltage value may be one of those values, or a combination of two or more of them.

In the mass spectrometer according to the first aspect of the present invention, an analysis operator previously determines the applied-voltage candidate values and the number of times of the preliminary measurement. The mass spectrometer divides the unit measurements (combinations of MRM transitions and applied-voltage values) into a plurality of groups in such a manner that the number of unit measurements whose execution times overlap each other is minimized, and creates a preliminary measurement execution file corresponding to each group. Thus, the period of time (loop time) required for performing each of the overlapping unit measurements one time is made as short as possible in each preliminary measurement, so that the necessary and sufficient number of data can be acquired and the accuracy of the mass chromatograms will thereby be improved. In the case where the loop time is fixed, the longest possible period of time can be secured for each unit measurement to improve the measurement accuracy. The analysis operator can easily create preliminary measurement execution files by merely determining the applied-voltage candidate values and the number of times of the preliminary measurement (i.e. the number of preliminary measurement execution files).

The second aspect of the present invention developed for solving the previously described problem is a mass spectrometer having the function of optimizing a condition of a multiple reaction monitoring measurement performed for each of a plurality of target compounds separated from each other by a chromatograph, the mass spectrometer including:

a) a storage section in which at least one MRM measurement condition is stored for each of the plurality of target compounds, the MRM measurement condition specifying an MRM transition which is a combination of a precursor ion and a product ion as well as an execution time slot in which a measurement using the MRM transition is executed within the entire measurement time;

b) an applied-voltage candidate value determiner for determining a plurality of applied-voltage candidate values for each of the plurality of MRM transitions, based on an input by an analysis operator;

c) a permissible number determiner for determining a maximum permissible number of overlaps of execution times of unit measurements among a plurality of unit measurements which individually correspond to all combinations of the plurality of MRM transitions and the plurality of applied-voltage candidate values, based on an input by an analysis operator;

d) a unit measurement divider for dividing the plurality of unit measurements into the smallest possible number of groups under the condition that the number of unit measurements whose execution times overlap each other does not exceed the maximum permissible number; and e) a preliminary measurement execution file creator for creating a preliminary measurement execution file for each of the plurality of groups.

In the mass spectrometer according to the second aspect of the present invention, an analysis operator previously determines the maximum permissible number of overlaps of the execution times of the unit measurements. Within this range, the mass spectrometer divides the plurality of unit measurements into the smallest possible number of groups and creates a preliminary measurement execution file corresponding to each group. This prevents the situation in which the loop time becomes extremely long or execution time of each unit measurement becomes extremely short. Thus, the number of times of the preliminary measurement can be minimized, while the accuracy of the mass chromatograms is maintained at a high level. The analysis operator can easily create preliminary measurement execution files by merely determining the maximum permissible number.

In the mass spectrometer according to the first or second aspect of the present invention, the unit measurement divider may preferably divide the plurality of unit measurements into the smallest possible number of groups in such a manner that the unit measurements which have the same MRM transition and the same execution time yet have different applied-voltage candidate values belong to the same group.

In a measurement using a chromatograph mass spectrometer, the pH of the mobile phase, state of the column and other conditions may gradually vary from one measurement to another, causing the elution time of the target compound from the column to be earlier or later, or be longer or shorter. Therefore, the applied-voltage value can be more accurately optimized by successively performing the measurements using the same MRM transition in one preliminary measurement.

In the mass spectrometer according to the first or second aspect of the present invention, the unit measurement divider may preferably divide the plurality of unit measurements in such a manner that the sum of the overlaps of the execution times of the unit measurements using different MRM transitions is minimized in each group. This minimizes the loop time throughout the entire measurement time while securing a sufficient length of execution time for each unit measurement.

The mass spectrometer according to the first or second aspect of the present invention may further include:

f) an additional execution time determiner for determining an additional execution time based on an input by an analysis operator; and g) a corrected execution time determiner for determining a corrected execution time by adding the additional execution time at least before or after the execution time slot specified for each of the plurality of MRM transitions, and for determining the corrected execution time as the execution time in the preliminary measurement.

According to this configuration, the entire set of data which form a peak on a mass chromatogram can be obtained even if the elution time of the target compound is displaced from the predicted retention time due to a slight variation in the pH of the mobile phase or state of the column among the individual preliminary measurements.

In a simultaneous analysis of a large number of target compounds, the number of used MRM transitions may be as many as several hundreds. In the conventional method described earlier, the analysis operator needs to manually write the determined value of the applied voltage for each MRM transition in the parent method file after the preliminary measurement. Therefore, it is possible that the analysis operator incorrectly enters the correspondence relationship between MRM transitions and applied-voltage values.

In view of this problem, the mass spectrometer according to the first or second aspect of the present invention may preferably further include:

h) a preliminary measurement executer for executing each of the plurality of created preliminary measurement execution files, and for acquiring, for each of the MRM transitions, a plurality of sets of mass chromatogram data corresponding to the plurality of applied-voltage candidate values;

i) a chromatogram data presenter for presenting, to the analysis operator, a plurality of sets of mass chromatogram data acquired for each of the plurality of MRM transitions;

j) a chromatogram data selector for allowing the analysis operator to select one of the plurality of sets of mass chromatogram data for each of the MRM transitions; and k) an actual measurement execution file creator for associating, for each of the plurality of MRM transitions, the applied-voltage candidate value corresponding to the selected set of mass chromatogram data with the MRM transition concerned, to create an actual measurement execution file for executing the multiple reaction monitoring measurement.

For example, the chromatogram data presenter may create a mass chromatogram from each of the plurality of sets of mass chromatogram data and display the mass chromatograms on a display unit to present them to the analysis operator. It may also print out chromatogram data to present them to the analysis operator.

By using the mass spectrometer which includes the preliminary measurement executer, chromatogram data presenter, chromatogram data selector and actual measurement execution file creator, an analysis operator can easily create an actual measurement execution file by merely selecting, for each MRM transition, a mass chromatogram in which an ion is detected with the highest sensitivity from a plurality of mass chromatograms. Since the actual measurement execution file is automatically created, there is no possibility that the analysis operator incorrectly enters the correspondence between the MRM transitions and the applied-voltage values.

The previously described mode of the mass spectrometer may further be configured as follows:

the preliminary measurement executer determines, for each of the plurality of MRM transitions, the beginning time and the ending time of a peak from mass chromatogram data which change with time, based on a predetermined criterion; and the actual measurement execution file creator determines the execution time for each of the plurality of MRM transitions based on the beginning time and the ending time of the peak.

With this mode of the mass spectrometer, it is possible to minimize the length of the execution time of each event in the actual measurement while assuredly acquiring data which fall within a peak range of a mass chromatogram in a measurement (event) using each MRM transition. As a result, the number of MRM measurements whose execution times overlap each other in the actual measurement will be decreased so that the loop time can be shortened.

The third aspect of the present invention developed for solving the previously described problem is a mass spectrometry method for optimizing a condition of a multiple reaction monitoring measurement performed for each of a plurality of target compounds separated from each other by a chromatograph, the method including the steps of:

a) creating at least one MRM measurement condition for each of the plurality of target compounds, the MRM measurement condition specifying an MRM transition which is a combination of a precursor ion and a product ion as well as an execution time slot in which a measurement using the MRM transition is executed within the entire measurement time;

b) determining a plurality of applied-voltage candidate values for each of the plurality of MRM transitions, based on an input by an analysis operator;

c) determining the number of times of a preliminary measurement to optimize an applied-voltage value in the plurality of MRM transitions, based on an input by an analysis operator, where the number of times are equal to or more than two;

d) dividing a plurality of unit measurements which individually correspond to all combinations of the plurality of MRM transitions and the plurality of applied-voltage values into the same number of groups as the number of times of the preliminary measurement, where all unit measurements are divided into the groups in such a manner as to minimize the largest value of the number of overlaps of execution times in each group; and e) creating a preliminary measurement execution file for each of the plurality of groups.

The fourth aspect of the present invention developed for solving the previously described problem is a mass spectrometry method for optimizing a condition of a multiple reaction monitoring measurement performed for each of a plurality of target compounds separated from each other by a chromatograph, the method including the steps of:

a) creating at least one MRM measurement condition for each of the plurality of target compounds, the MRM measurement condition specifying an MRM transition which is a combination of a precursor ion and a product ion as well as an execution time slot in which a measurement using the MRM transition is executed within the entire measurement time;

b) determining a plurality of applied-voltage candidate values for each of the plurality of MRM transitions, based on an input by an analysis operator;

c) determining a maximum permissible number of overlaps of execution times of unit measurements among a plurality of unit measurements which individually correspond to all combinations of the plurality of MRM transitions and the plurality of applied-voltage candidate values, based on an input by an analysis operator;

d) dividing the plurality of unit measurements into the smallest possible number of groups under the condition that the number of unit measurements whose execution times overlap each other does not exceed the maximum permissible number; and e) creating a preliminary measurement execution file for each of the plurality of groups.

The fifth aspect of the present invention is a program for mass spectrometry used for optimizing a condition of a multiple reaction monitoring measurement performed for each of a plurality of target compounds separated from each other by a chromatograph, the program making a computer function as a device for performing a mass spectrometry method according to the third or fourth aspect of the present invention, the computer including a storage section capable of storing at least one MRM measurement condition for each of the plurality of target compounds, the MRM measurement condition specifying an MRM transition which is a combination of a precursor ion and a product ion as well as an execution time slot in which a measurement using the MRM transition is executed within the entire measurement time.

Advantageous Effects of the Invention

With the mass spectrometer, mass spectrometry method or program for mass spectrometry according to the present invention, it is possible to easily create a preliminary measurement execution file used for performing a preliminary measurement for optimizing the value of a voltage applied to a specific section of a mass spectrometer for each of a plurality of MRM measurements each of which has a previously specified execution time slot and a previously specified MRM transition, as well as to acquire mass chromatograms with high accuracy by executing the created file.

BRIEF DESCRIPTION OF DRAWINGS

FIG. 1 is an example of the parent method file.

FIG. 2 is an example of child method files created from a parent method file by a conventional method.

FIG. 3 is a flowchart of a conventional mass spectrometry method.

FIG. 12 is a flowchart of the mass spectrometry method according to the second embodiment.

DESCRIPTION OF EMBODIMENTS

Embodiments of the mass spectrometer, mass spectrometry method and program for mass spectrometry are hereinafter described with reference to the drawings.

First Embodiment

Figure 4:
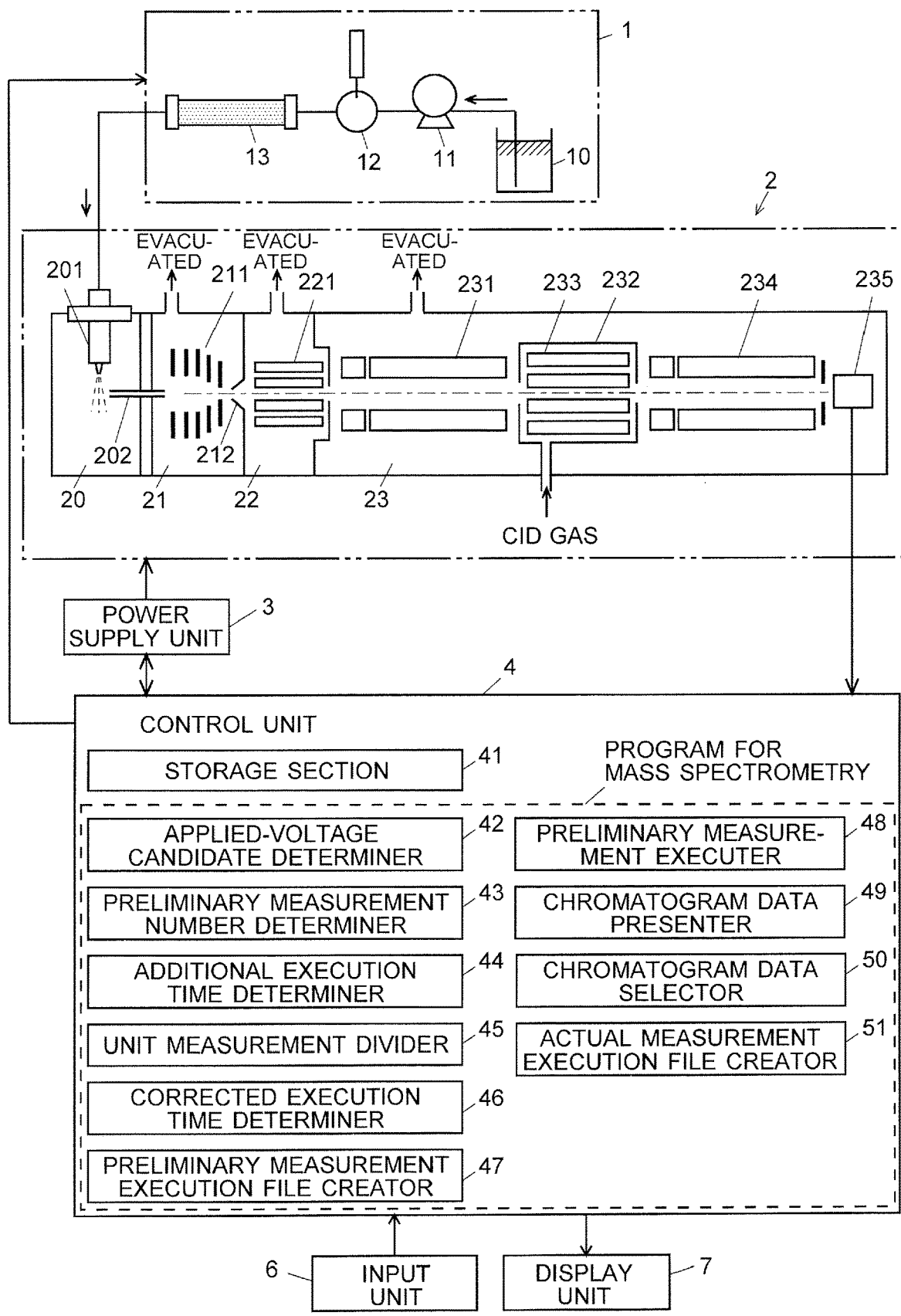
FIG. 4 is a configuration diagram showing the main components of a liquid chromatograph mass spectrometer constructed by combining a mass spectrometer according to the first embodiment with a liquid chromatograph.
Figure 5:
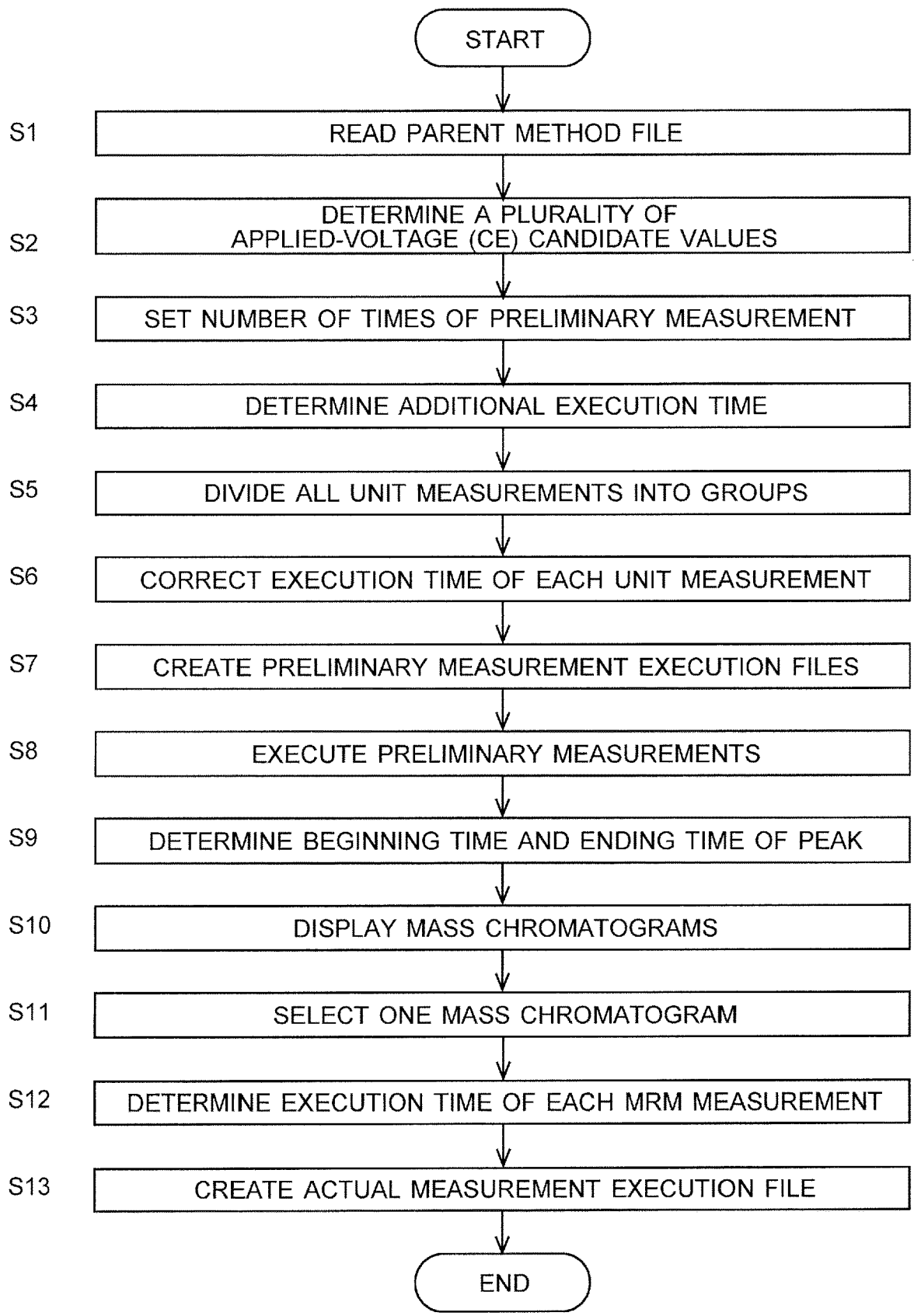
FIG. 5 is a flowchart of the mass spectrometry method according to the first embodiment.

FIG. 4 is a configuration diagram showing the main components of a liquid chromatograph mass spectrometer (LC/MS/MS) constructed by combining a mass spectrometer according to the first embodiment with a liquid chromatograph. FIG. 5 is a flowchart related to the mass spectrometry method in the present embodiment.

The chromatograph mass spectrometer in the present embodiment includes a liquid chromatograph unit 1, mass spectrometer unit 2 and power supply unit 3 as well as a control unit 4 for controlling those units. The liquid chromatograph unit 1 includes: a mobile phase container 10 in which a mobile phase is stored; a pump 11 for drawing the mobile phase and supplying it at a fixed flow rate; an injector 12 for injecting a predetermined amount of sample liquid into the mobile phase; and a column 13 for temporally separating various compounds contained in the liquid sample.

The mass spectrometer unit 2 has the configuration of a multi-stage differential pumping system including an ionization chamber 20 maintained at approximately atmospheric pressure and an analysis chamber 23 evacuated to a high degree of vacuum by a vacuum pump (not shown), between which first and second intermediate vacuum chambers 21 and 22 are provided having their degrees of vacuum increased in a stepwise manner. The ionization chamber 20 is provided with an electrospray ionization probe (ESI probe) 201 for spraying a sample solution while imparting electric charges to the same solution. The ionization chamber 20 communicates with the first intermediate vacuum chamber 21 in the next stage via a thin heated capillary 202. The first intermediate vacuum chamber 21 is separated from the second intermediate vacuum chamber 22 by a skimmer 212 having a small hole at its apex. The first and second intermediate vacuum chambers 21 and 22 respectively contain ion guides 211 and 221 for transporting ions to the next stage while converging the ions. The analysis chamber 23 contains a front quadrupole mass filter (Q1) 231 which separates ions according to their mass-to-charge ratios and a rear quadrupole mass filter (Q3) 234 which also separates ions according to their mass-to-charge ratios, with a collision cell 232 containing a multipole ion guide (q2) 233 placed between the two mass filters, as well as an ion detector 235.

A CID gas, such as argon or nitrogen, can be continuously or intermittently supplied into the collision cell 232. The power supply unit 3 applies predetermined voltages to the ESI probe 201, ion guides 211, 221 and 233, quadrupole mass filters 231 and 234 as well as other relevant elements, respectively. In each of the quadrupole mass filters 231 and 234, pre-rod electrodes for correcting the disturbance of the electric field at the inlet end are provided before the main rod electrodes. A voltage which is different from those applied to the main rod electrodes can be applied to the pre-rod electrodes.

The mass spectrometer unit 2 can perform various measurements, such as a SIM (selected ion monitoring) measurement, product-ion scan measurement and MRM (multiple reaction monitoring) measurement. In the SIM measurement, no selection of an ion is performed in the front quadrupole mass filter (Q1) 231 (i.e. this mass filter is disabled from functioning), while the rear quadrupole mass filter (Q3) 234 is operated to allow ions to pass through this filter only at a fixed mass-to-charge ratio and be detected.

On the other hand, in the MS/MS scan measurement (product ion scan measurement) and MRM measurement, the front quadrupole mass filter (Q1) 231 and rear quadrupole mass filter (Q3) 234 are both made to function as the mass filters. The front quadrupole mass filter (Q1) 231 allows only an ion designated as the precursor ion to pass through. Additionally, the CID gas is supplied into the collision cell 232 to fragment the precursor ion into product ions. In the MS/MS scan measurement, the mass-to-charge ratio of the ion to be allowed to pass through the rear quadrupole mass filter (Q3) 234 is continuously changed. In the MRM measurement, the mass-to-charge ratio of the ion to be allowed to pass through the rear quadrupole mass filter (Q3) 234 is fixed.

The control unit 4 includes a storage section 41 as well as the following components as functional blocks: an applied-voltage candidate value determiner 42, preliminary measurement number determiner 43, additional execution time determiner 44, unit measurement divider 45, corrected execution time determiner 46, preliminary measurement execution file creator 47, preliminary measurement executer 48, chromatogram data presenter 49, chromatogram data selector 50, and actual measurement execution file creator 51. The control unit 4 is actually a personal computer, on which a program for mass spectrometry (which corresponds to the program for mass spectrometry according to the present invention) is previously installed. By executing this program, this computer can be made to function as the aforementioned components. An input unit 6 and display unit 7 are connected to the control unit 4.

The mass spectrometry method in the first embodiment is hereinafter described with reference to the flowchart in FIG. 5. In the first embodiment, the conditions of MRM measurements for a plurality of target compounds contained in a sample are to be optimized. Specifically, the fragmentation energy in the MRM measurement using each MRM transition is to be optimized. For ease of explanation, the following description deals with the case of optimizing only the fragmentation energy, although there are also voltages to be optimized in the MRM measurement other than the fragmentation energy, such as a bias voltage applied to the front quadrupole mass spectrometer 231 or rear quadrupole mass spectrometer 234 as well as the voltages applied to the ion guides 211 or 221.

The fragmentation energy in the first embodiment is the magnitude of the voltage for accelerating a precursor ion to make it collide with the CID gas in the collision cell 232. This energy may also be called the "collision energy (CE) value".

An analysis operator initially reads an analysis execution file previously saved in the storage section 41 (Step S1). This analysis execution file (which is hereinafter called the "parent method file") describes execution conditions of a series of MRM measurements (which is hereinafter called the "parent method"), in which two MRM transitions as well as an execution time of the MRM measurements using those MRM transitions (these measurements are hereinafter called the "parent events") are associated with each of the 50 target compound names. The analysis conditions of each parent event are previously determined, for example, with reference to a compound database.

After the parent method file has been read, the applied-voltage candidate value determiner 42 displays a screen on the display unit 7 which prompts the analysis operator to enter a plurality of candidate values of the applied voltage (which is the fragmentation energy in the present embodiment) to be set for each MRM transition. The analysis operator enters the minimum value (5V), maximum value (60V) and interval (5V) of the fragmentation energy. Based on those values, the applied-voltage candidate value determiner 42 determines 12 candidate values of the fragmentation energy for each MRM transition (Step S2). Each of the 100 parent events is thereby divided into 12 events. Thus, 1200 MRM measurements to be performed in the preliminary measurement are determined (each of those MRM measurements is hereinafter called the "child event", which corresponds to the unit measurement in the present invention). In the present example, the same set of CE candidate values are applied to all parent events to create child events. It is also possible to allow the analysis operator to enter a different set of CE candidate values for each parent event so that a different set of CE candidate values will be set for each parent event in creating the child events.

Next, the preliminary measurement number determiner 43 displays a screen which prompts the analysis operator to enter the number of times of the execution of the preliminary measurement. The preliminary measurement in the present embodiment is a measurement for optimizing the CE value for each of the MRM transitions. The preliminary measurement number determiner 43 determines the number of times of the preliminary measurement based on an input (10 times) by the analysis operator (Step S3).

The additional execution time determiner 44 displays a screen which prompts the analysis operator to enter the additional execution time, and determines the additional execution time based on an input (1.0 min) by the analysis operator (Step S4). The additional execution time will be described later. It should be noted that setting the additional execution time is not essential; the analysis operator can choose to "skip" the displayed screen to perform the preliminary measurement without using the additional execution time.

After the applied-voltage (fragmentation energy) candidate values (CE candidate values), number of times of the preliminary measurement, and additional execution time (only when used) have all been determined, the preliminary measurement divider 45 divides the 1200 child events into the same number of groups as the number of times of the preliminary measurement (10 groups) in such a manner that the child events derived from the same parent event belong to the same group while the number of child events whose execution times overlap each other is minimized (Step S5). Thus, one preliminary measurement including a plurality of child events in series is determined for each group (this measurement is hereinafter called the "child method"). If there are two or more possible forms of the division of the child events in which the number of child events whose execution times overlap each other is minimized, the unit measurement divider 45 divides the child events in such a manner that the sum of the execution times which overlap each other between different MRM transitions (which correspond to the child events derived from different parent events) is minimized.

Figure 6:
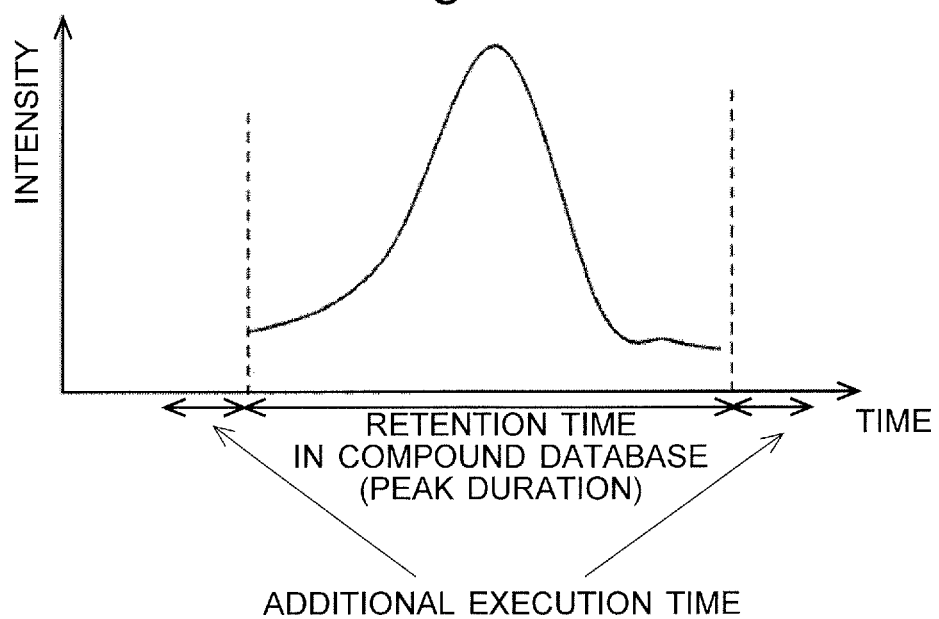
FIG. 6 is a diagram illustrating an additional execution time in the first embodiment.

After the child methods have been determined, the corrected execution time determiner 46 corrects the execution time previously set for each child event (Step S6). As shown in FIG. 6, this correction is made by adding the additional execution time, which has been entered by the analysis operator, before and after the execution time. As noted earlier, the execution times of the parent events are determined based on the retention time of each target compound described in a compound database or the like. However, the actual elution time of the target compound may be displaced from the retention time described in the database due to a variation in a measurement condition (e.g. pH of the mobile phase or state of the column). Considering such a case, the device in the present embodiment allows the analysis operator to enter the additional execution time so that the entire peak of the mass chromatogram will be assuredly acquired even in the case where the elution time of the target compound may undergo slight variations.

After the correction of the execution times in each individual child event by the corrected execution time determiner 46 has been completed, the execution conditions of the child events including the MRM transition, (corrected)

execution time and CE candidate value as one set are fixed, and one preliminary measurement execution file (which is called the "child method file") is created for each group. The created files are saved in the storage section 41 (Step S7).

Figure 7A:
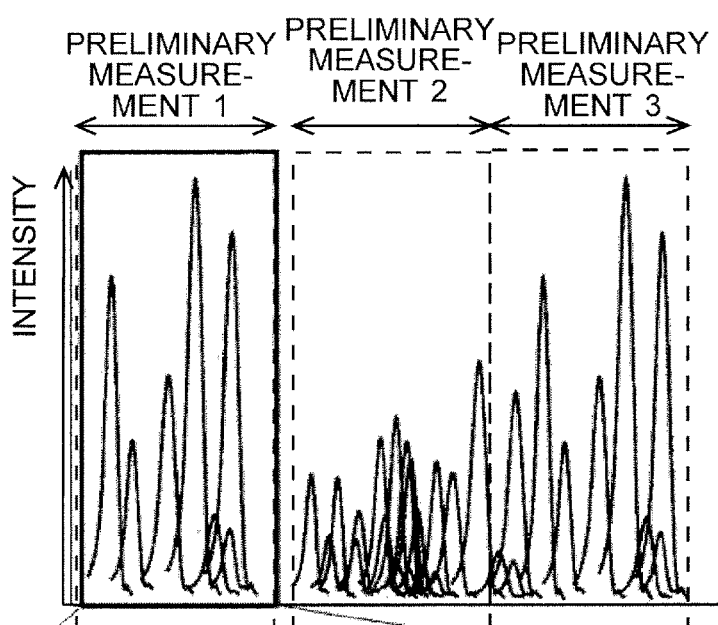
FIGS. 7A and 7B are diagrams illustrating a preliminary measurement in the case where a conventional mass spectrometry method is used.

A comparison is hereinafter made between a preliminary measurement execution file created in the present embodiment and one created by a conventional method (Non Patent Literature 1) for a sample containing a plurality of target compounds. FIG. 7A is a mass chromatogram acquired by executing the parent events for the sample. For ease of description, the number of times of the preliminary measurement is assumed to be three.

Figure 7B:
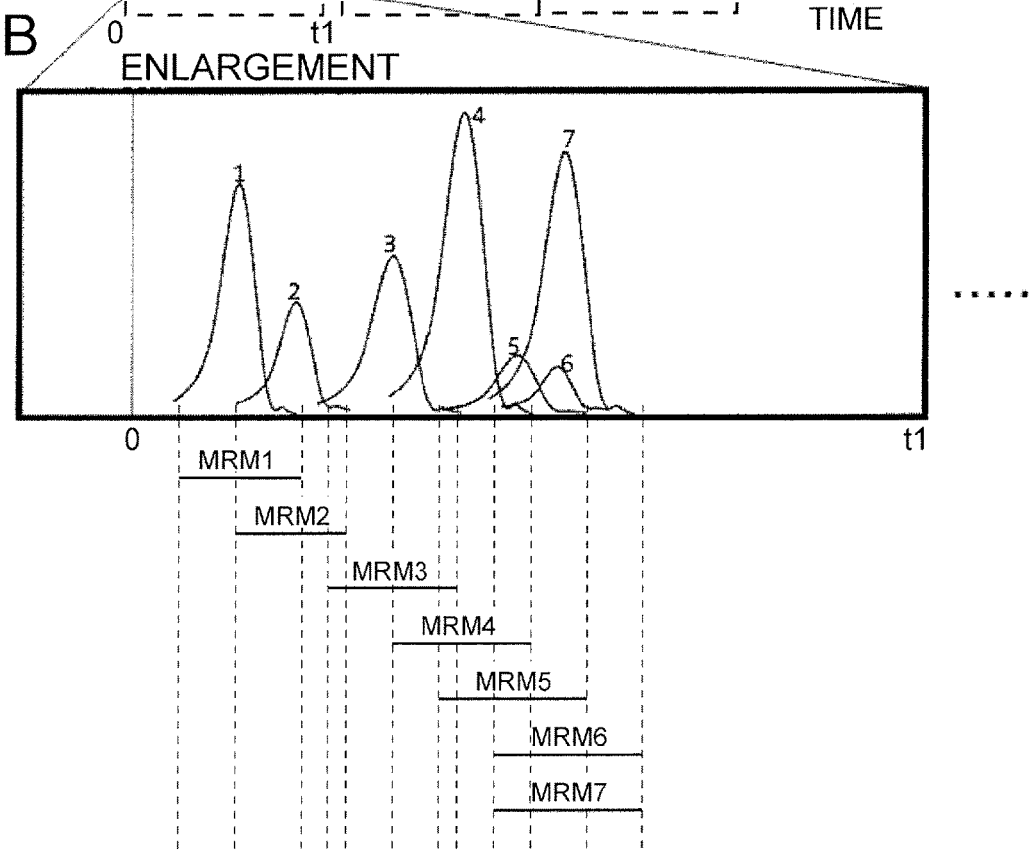

As noted earlier, in the method according to Non Patent Literature 1, parent events are extracted mechanically (e.g. in the described order in the parent method file) to create a plurality of child methods and prepare preliminary measurement method files 1-3. According to this method, as shown by the dashed lines in FIG. 7A, the parent events are extracted in batches of the same number in order of execution time to create preliminary measurement execution files. FIG. 7B shows an enlarged view of the preliminary measurement 1 (time range: 0 to t1). As can be seen, there are a maximum of four MRM measurements having different MRM transitions (those measurements correspond to parent events) whose execution times overlap each other (specifically, the execution times of MRM4 to MRM7 overlap each other). There are also many other time segments in which the execution times of two or three different MRM measurements overlap each other. Since 12 child events are created from each parent event in the present embodiment, there will be a maximum of 48 child events whose execution times overlap each other in the preliminary measurement. When there are as many as 48 child events whose execution times overlap each other, the period of time required for those child events to be individually executed one time (loop time) will be too long to acquire a necessary and sufficient number of points of data for creating a mass chromatogram.

Figure 8:
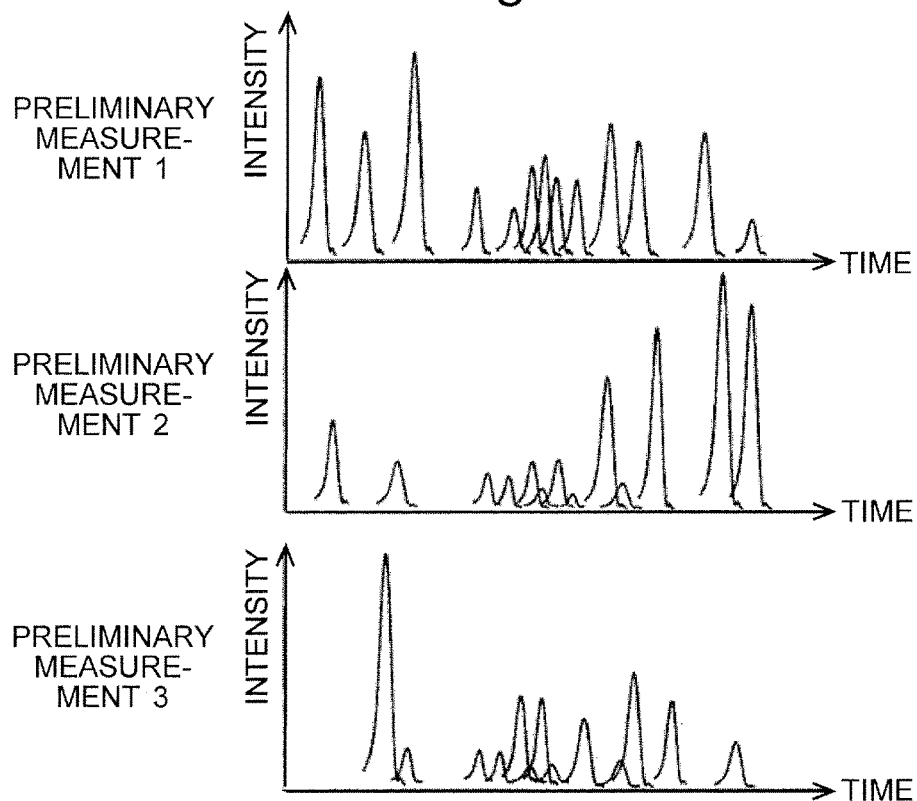
FIG. 8 is a diagram illustrating a preliminary measurement in the first embodiment.
Figure 9:
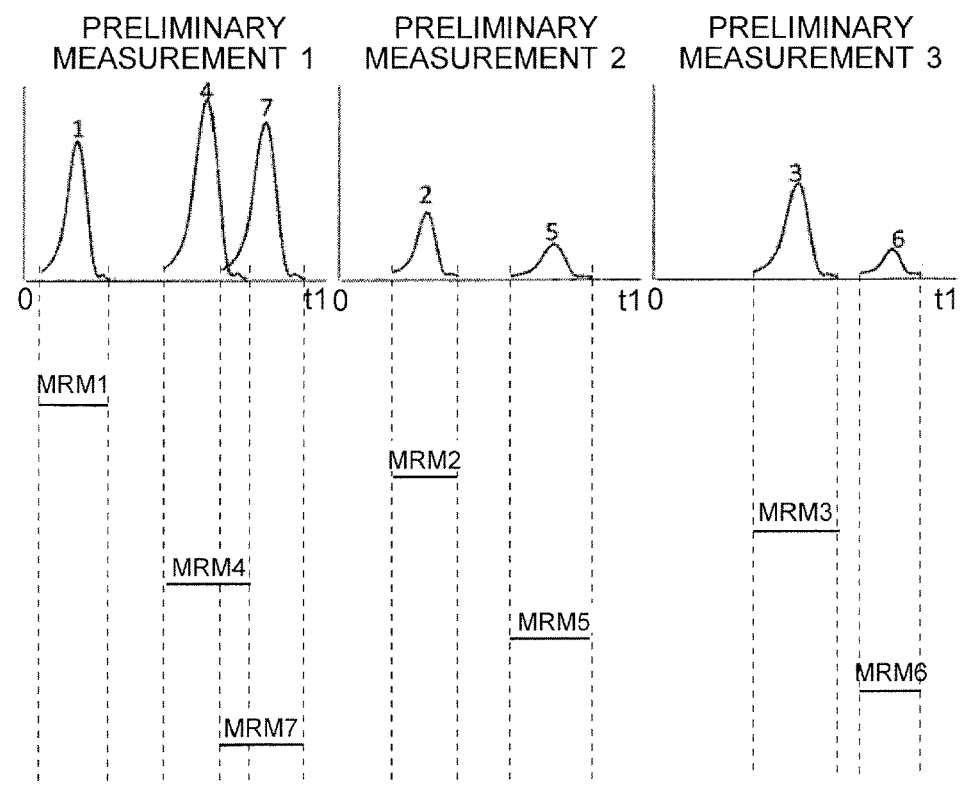
FIG. 9 is another diagram illustrating the preliminary measurement in the first embodiment.

By comparison, in the method according to the first embodiment, the preliminary measurement execution files 1-3 are prepared in such a manner that the number of execution times which overlap each other is minimized (see FIG. 8). FIG. 9 shows an enlarged view of the preliminary measurements 1-3 (time range of 0 to t1 on the expanded scale). In this method, there is merely a maximum of two MRM measurement whose execution times overlap each other within the time range of 0 to t1. Furthermore, there is only one occurrence of the overlapping (i.e. the overlapping of MRM 4 and MRM7 in the preliminary measurement 1). Accordingly, the loop time can be shorter than in the conventional method, so that a sufficient number of points of data can be acquired in each child event to create a highly accurate mass chromatogram.

After the preliminary measurement execution files have been created, the analysis operator performs a predetermined operation to issue a command to initiate the preliminary measurement. Then, the preliminary measurement executer 48 reads each preliminary measurement execution file from the storage section 41 and executes the child methods described in the file, to acquire mass chromatogram data for each child event and save the data in the storage section 41 (Step S8). While acquiring the mass chromatogram data in this measurement, the preliminary measurement executer 48 determines the beginning time and ending time of a peak in the mass chromatogram based on those data (Step S9).

For example, the beginning time and ending time of a peak can be determined in such a manner that a point in time where the intensity value in the mass chromatogram data has exceeded a predetermined threshold is chosen as the peak-beginning time, while a point in time where the intensity value has fallen below the threshold is chosen as the peak-ending time. Alternatively, a point in time where the change in intensity value has exceeded a positive predetermined gradient may be chosen as the peak-beginning time, while a point in time where the change in intensity value has fallen below a negative predetermined value may be chosen as the peak-ending time.

Figure 10:
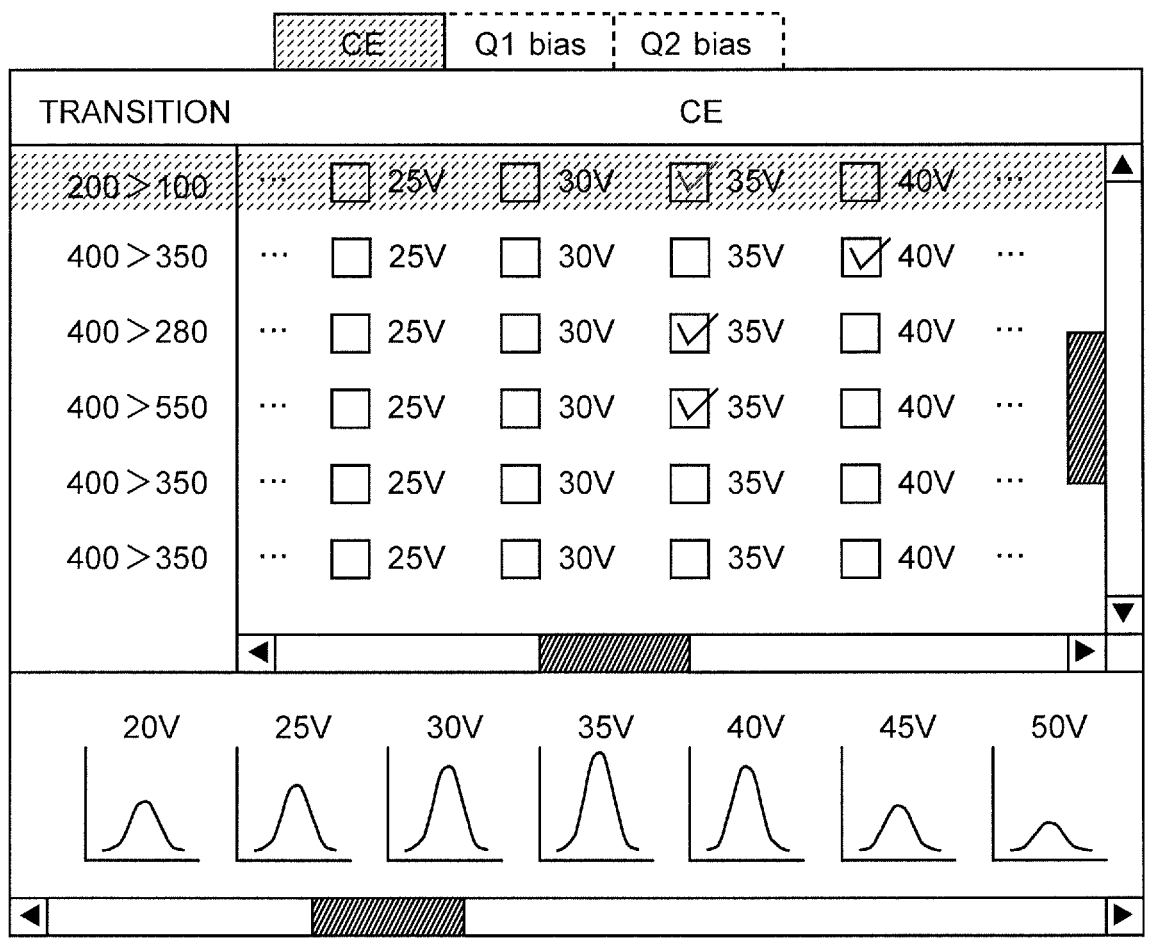
FIG. 10 is an example of a display screen in the first embodiment.

After all preliminary measurement execution files have been executed and the mass chromatogram data have been obtained for all child events, the chromatogram data presenter 49 creates mass chromatograms from those mass chromatogram data and displays a screen as shown in FIG. 10 on the display unit 7 (Step S10). Specifically, mass chromatograms obtained at different CE candidate values with the same MRM transition and execution time are arranged in the lower area of the screen. The analysis operator compares the displayed mass chromatograms, locates the mass chromatogram in which the product ion is detected with the highest sensitivity, and selects this mass chromatogram by checking the checkbox of the corresponding CE candidate value among the plurality of CE candidate values displayed in the upper area of the screen (Step S11).

After the selection of one mass chromatogram (CE candidate value) by the analysis operator has been completed for all MRM transitions, the actual measurement execution file creator 51 determines the measurement execution time for each MRM transition by adding the additional execution time, which was set by the analysis operator in Step S4, before the peak-beginning time as well as after the peak-ending time determined based on the mass chromatogram, and creates an actual measurement execution file (Step S12). This ensures that the data of the entire peak in the mass chromatogram can be acquired in the actual measurement even in the case where some measurement condition (e.g. state of the column) slightly changes during the period of time from the preliminary measurement to the actual measurement.

As described thus far, with the mass spectrometer, mass spectrometry method or program for mass spectrometry according to the first embodiment, the analysis operator only needs to enter the CE candidate values, number of times of the preliminary measurement and additional execution time (only when used) to create preliminary measurement execution files (child method files) for optimizing the applied-voltage value for each MRM transition. The loop time in each child method is made to be as short as possible so that a necessary and sufficient number of data can be acquired to create a highly accurate mass chromatogram. The analysis operator can also create the actual measurement execution file by merely selecting one of the mass chromatograms acquired at different applied-voltage values for each MRM transition.

Second Embodiment

Figure 11:
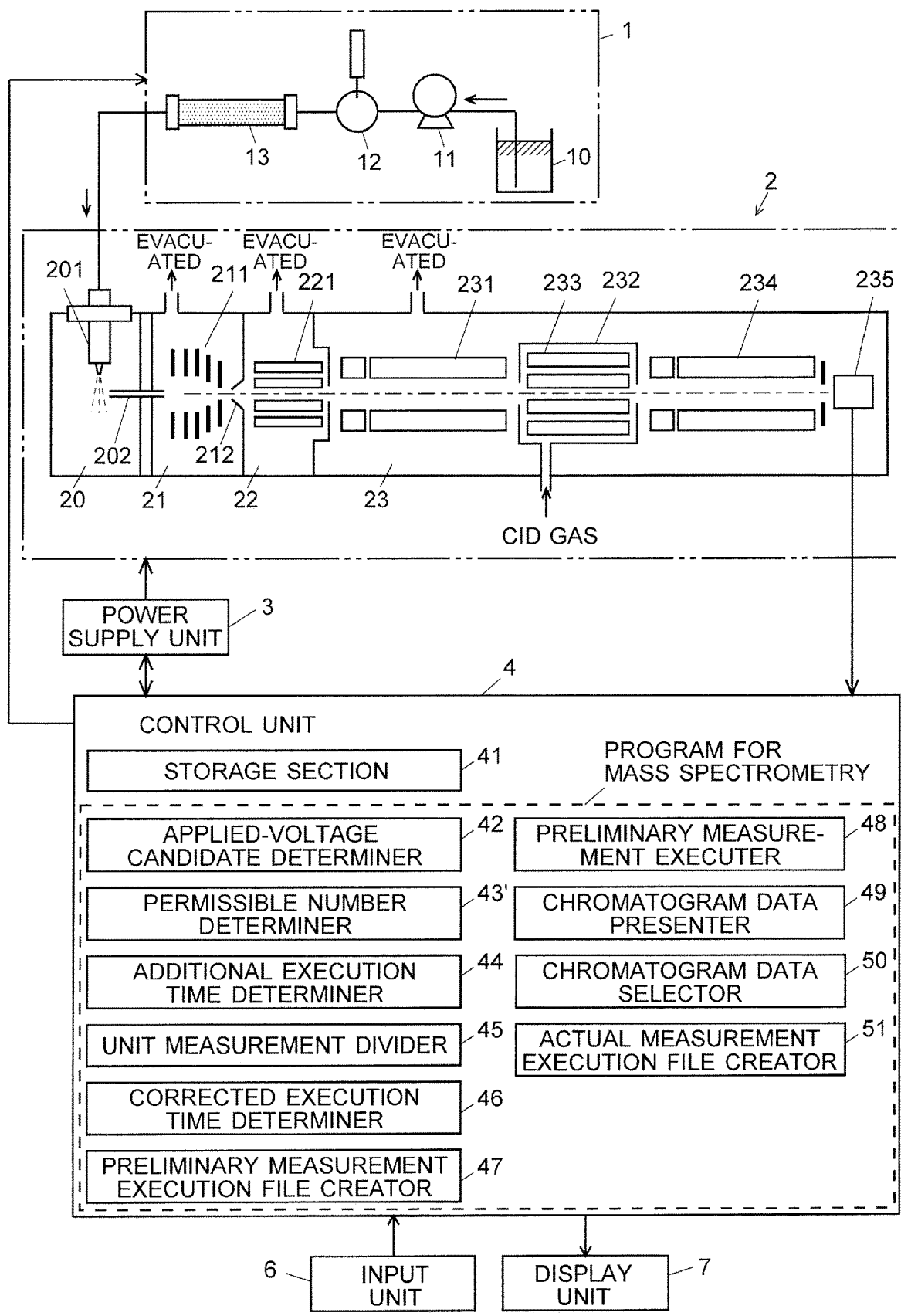
FIG. 11 is a configuration diagram showing the main components of a liquid chromatograph mass spectrometer constructed by combining a mass spectrometer according to the second embodiment with a liquid chromatograph.

Next, a mass spectrometer, mass spectrometry method and program for mass spectrometry according to the second embodiment are described. FIG. 11 is a configuration diagram showing the main components of a liquid chromatograph mass spectrometer (LC/MS/MS) constructed by combining the mass spectrometer according to the second embodiment with a liquid chromatograph. FIG. 12 is a flowchart related to the mass spectrometry method in the second embodiment. The configurations and steps which are common to both first and second embodiments will be denoted by the same numerals, and their descriptions will be appropriately omitted.

In the mass spectrometer according to the second embodiment, the control unit 4' functionally includes a permissible number determiner 43'. Steps S1 and S2 in the second embodiment are the same as those of the first embodiment. In the second embodiment, after a plurality of applied-voltage candidate values have been determined (Step S2), the permissible number determiner 43' displays a screen which prompts the analysis operator to enter the maximum number of child events whose execution times are permitted to overlap each other in the preliminary measurement, and determines the maximum permissible number based on an input by the analysis operator (Step S3'). Then, as in the first embodiment, the additional execution time determiner 44 determines the additional execution time based on an input by the analysis operator (Step S4).

Then, as with the previous embodiment, the 1200 child events are divided into a plurality of groups in such a manner that child events derived from the same parent event belong to the same group (Step S5'). However, as opposed to the first embodiment in which the child events are divided so that the number of child events whose execution times overlap each other will be minimized, the division of the 1200 child events in the second embodiment is made under the condition that the largest value of the number of child events whose execution times overlap each other in each group after the division should not exceed the maximum permissible number which has been set by the analysis operator. Steps S6 through S12 which are performed after the division of the child events are the same as those of the first embodiment.

In the second embodiment, as just described, the maximum permissible number which is determined based on an input by the analysis operator is included in the conditions of the division of the child events. The child events are divided into the smallest possible number of groups under those conditions. This prevents the situation in which the loop time becomes extremely long due to a presence of an extremely large number of child events with their execution times overlapping each other in the preliminary measurement. Accordingly, highly accurate mass chromatograms can be obtained in the preliminary measurements (Step S8). Furthermore, since the child events are divided into the smallest possible number of groups (i.e. the smallest possible number of preliminary measurement execution files are created), the number of times of the preliminary measurement can be decreased to the smallest possible number.

The first and second embodiments are mere examples and may be appropriately changed within the spirit of the present invention.

Although the previous embodiments are concerned with the case of optimizing a condition for performing an MRM measurement of a plurality of target compounds temporally separated by a liquid chromatograph, a similar configuration can also be adopted in the case where the target compounds are separated by a gas chromatograph.

In the previous embodiments, it is assumed that the CE value is the only applied voltage to be optimized. The previously described method can also be applied in the case of optimizing a plurality of kinds of applied voltages. For example, a plurality of candidate values may be set for each of the following voltages: the bias voltage applied to the front quadrupole mass filter 231, collision energy (CE) applied to the collision cell 232, and bias voltage applied to the rear quadrupole mass filter 234. The three kinds of applied voltages can all be optimized by creating, for each MRM measurement, child events which respectively corresponds to all possible combinations of the candidate values of the three kinds of applied voltages.

In the previous embodiments, child events are divided in such a manner that the child events derived from the same parent event belong to the same group. It is also possible to divide child events in such a manner that the child events derived from the same parent event belong to different groups. Child events derived from the same parent event have the same execution time. Therefore, dividing those child events so that they belong to different groups allows the loop time to be even shorter. However, as noted earlier, if a slight variation in a measurement condition (state of the column, temperature or the like) may possibly occur from measurement to measurement, the variation in the measurement condition affects the data to be acquired. To avoid this problem, it is preferable to divide child events in such a manner that the child events derived from the same parent event belong to the same group, as in the first and second embodiments.

In addition, in the first and second embodiments, the chromatogram data presenter 49 displays chromatograms created from mass chromatogram data acquired by the preliminary measurement on the screen of the display unit 7. It is also possible to print out mass chromatograms or mass chromatogram data and allow the analysis operator to check them and enter a number or similar information which identifies a mass chromatogram (data) for each MRM transition.

REFERENCE SIGNS LIST

1 . . . Liquid Chromatograph Unit
2 . . . Mass Spectrometer Unit
3 . . . Poser Supply Unit
4, 4' . . . Control Unit
41 . . . Storage Section
42 . . . Applied-Voltage Candidate Value Determiner
43 . . . Preliminary Measurement Number Determiner
43' . . . Permissible Number Determiner
44 . . . Additional Execution Time Determiner
45 . . . Unit Measurement Divider
46 . . . Corrected Execution Time Determiner
47 . . . Preliminary Measurement Execution File Creator
48 . . . Preliminary Measurement Executer
49 . . . Chromatogram Data Presenter
50 . . . Chromatogram Data Selector
51 . . . Actual Measurement Execution File Creator
6 . . . Input Unit
7 . . . Display Unit

The invention claimed is:

1. A mass spectrometer having a function of optimizing a condition of a multiple reaction monitoring measurement performed for each of a plurality of target compounds separated from each other by a chromatograph, the mass spectrometer comprising:
a detector,
a plurality of electrodes configured to pass ions to the detector; and
a control unit including
a) a storage section in which at least one MRM measurement condition is stored for each of the plurality of target compounds, the MRM measurement condition specifying an MRM transition which is a combination of a precursor ion and a product ion as well as an execution time slot in which a measurement using the MRM transition is executed within an entire measurement time;
b) an applied-voltage candidate value determiner for determining a plurality of applied-voltage candidate values for each of the plurality of MRM transitions, based on an input by an analysis operator, the applied voltage candidate values being values for voltages applied to the plurality of electrodes;
c) a preliminary measurement number determiner for determining a number of times of a preliminary measurement to optimize an applied-voltage value in the plurality of MRM transitions, based on an input by an analysis operator, where the number of times is equal to or more than two;
d) a unit measurement divider for dividing a plurality of unit measurements which individually correspond to all combinations of the plurality of MRM transitions and the plurality of applied-voltage candidate values into a same number of groups as the number of times of the preliminary measurement, where the unit measurement divider divides all unit measurements into the groups in such a manner as to minimize a largest value of a number of overlaps of execution times in each group; and
e) a preliminary measurement execution file creator for creating a preliminary measurement execution file for each of the plurality of groups.

2. A mass spectrometer having a function of optimizing a condition of a multiple reaction monitoring measurement performed for each of a plurality of target compounds separated from each other by a chromatograph, the mass spectrometer comprising:
a detector,
a plurality of electrodes configured to pass ions to the detector; and
a control unit including
a) a storage section in which at least one MRM measurement condition is stored for each of the plurality of target compounds, the MRM measurement condition specifying an MRM transition which is a combination of a precursor ion and a product ion as well as an execution time slot in which a measurement using the MRM transition is executed within an entire measurement time;
b) an applied-voltage candidate value determiner for determining a plurality of applied-voltage candidate values for each of the plurality of MRM transitions, based on an input by an analysis operator, the applied voltage candidate values being values for voltages applied to the plurality of electrodes;
c) a permissible number determiner for determining a maximum permissible number of overlaps of execution times of unit measurements among a plurality of unit measurements which individually correspond to all combinations of the plurality of MRM transitions and the plurality of applied-voltage candidate values, based on an input by an analysis operator;
d) a unit measurement divider for dividing the plurality of unit measurements into a smallest possible number of groups under a condition that a number of unit measurements whose execution times overlap each other does not exceed the maximum permissible number; and
e) a preliminary measurement execution file creator for creating a preliminary measurement execution file for each of the plurality of groups.

3. The mass spectrometer according to claim 1, wherein the unit measurement divider divides the plurality of unit measurements into a smallest possible number of groups in such a manner that the unit measurements which have the same MRM transition and the same execution time yet have different applied-voltage candidate values belong to the same group.

4. The mass spectrometer according to claim 1, wherein the unit measurement divider divides the plurality of unit measurements in such a manner that a sum of the overlaps of the execution times of the unit measurements using different MRM transitions is minimized in each group.

5. The mass spectrometer according to claim 1, the control unit further comprising:
f) an additional execution time determiner for determining an additional execution time based on an input by an analysis operator; and
g) a corrected execution time determiner for determining a corrected execution time by adding the additional execution time at least before or after the execution time slot specified for each of the plurality of MRM transitions, and for determining the corrected execution time as the execution time in the preliminary measurement.

6. The mass spectrometer according to claim 1, the control unit further comprising:
h) a preliminary measurement executer for executing each of the plurality of created preliminary measurement execution files, and for acquiring, for each of the MRM transitions, a plurality of sets of mass chromatogram data corresponding to the plurality of applied-voltage candidate values;
i) a chromatogram data presenter for presenting, to the analysis operator, a plurality of sets of mass chromatogram data acquired for each of the plurality of MRM transitions;
j) a chromatogram data selector for allowing the analysis operator to select one of the plurality of sets of mass chromatogram data for each of the MRM transitions; and
k) an actual measurement execution file creator for associating, for each of the plurality of MRM transitions, the applied-voltage candidate value corresponding to the selected set of mass chromatogram data with the MRM transition concerned, to create an actual measurement execution file for executing the multiple reaction monitoring measurement.

7. The mass spectrometer according to claim 6, wherein the chromatogram data presenter creates a mass chromatogram from each of the plurality of sets of mass chromatogram data and displays the mass chromatograms on a display unit to present them to the analysis operator.

8. The mass spectrometer according to 6, wherein:
the preliminary measurement executer determines, for each of the plurality of MRM transitions, a beginning time and an ending time of a peak from mass chromatogram data which change with time, based on a predetermined criterion; and
the actual measurement execution file creator determines the execution time for each of the plurality of MRM transitions based on the beginning time and the ending time of the peak.

9. A mass spectrometry method for optimizing a condition of a multiple reaction monitoring measurement performed for each of a plurality of target compounds separated from each other by a chromatograph, the method comprising steps of:

a) creating at least one MRM measurement condition for each of the plurality of target compounds, the MRM measurement condition specifying an MRM transition which is a combination of a precursor ion and a product ion as well as an execution time slot in which a measurement using the MRM transition is executed within an entire measurement time;

b) determining a plurality of applied-voltage candidate values for each of the plurality of MRM transitions, based on an input by an analysis operator, the applied voltage candidate values being values for voltages applied to the plurality of electrodes configured to pass ions to a detector;

c) determining a number of times of a preliminary measurement to optimize an applied-voltage value in the plurality of MRM transitions, based on an input by an analysis operator, where the number of times is equal to or more than two;

d) dividing a plurality of unit measurements which individually correspond to all combinations of the plurality of MRM transitions and the plurality of applied-voltage values into a same number of groups as the number of times of the preliminary measurement, where all unit measurements are divided into the groups in such a manner as to minimize a largest value of a number of overlaps of execution times in each group; and e) creating a preliminary measurement execution file for each of the plurality of groups.

10. A mass spectrometry method for optimizing a condition of a multiple reaction monitoring measurement performed for each of a plurality of target compounds separated from each other by a chromatograph, the method comprising steps of:

a) creating at least one MRM measurement condition for each of the plurality of target compounds, the MRM measurement condition specifying an MRM transition which is a combination of a precursor ion and a product ion as well as an execution time slot in which a measurement using the MRM transition is executed within an entire measurement time;

b) determining a plurality of applied-voltage candidate values for each of the plurality of MRM transitions, based on an input by an analysis operator, the applied voltage candidate values being values for voltages applied to a plurality of electrodes configured to pass ions to a detector;

c) determining a maximum permissible number of overlaps of execution times of unit measurements among a plurality of unit measurements which individually correspond to all combinations of the plurality of MRM transitions and the plurality of applied-voltage candidate values, based on an input by an analysis operator;

d) dividing the plurality of unit measurements into a smallest possible number of groups under a condition that a number of unit measurements whose execution times overlap each other does not exceed the maximum permissible number; and e) creating a preliminary measurement execution file for each of the plurality of groups.

11. A non-transitory computer readable medium recording a program for mass spectrometry used for optimizing a condition of a multiple reaction monitoring measurement performed for each of a plurality of target compounds separated from each other by a chromatograph, wherein:

the program makes a computer function as a device for performing a mass spectrometry method according to claim 9, the computer including a storage section capable of storing at least one MRM measurement condition for each of the plurality of target compounds, the MRM measurement condition specifying an MRM transition which is a combination of a precursor ion and a product ion as well as an execution time slot in which a measurement using the MRM transition is executed within an entire measurement time.

12. The mass spectrometer according to claim 2, wherein the unit measurement divider divides the plurality of unit measurements into a smallest possible number of groups in such a manner that the unit measurements which have the same MRM transition and the same execution time yet have different applied-voltage candidate values belong to the same group.

13. The mass spectrometer according to claim 2, wherein the unit measurement divider divides the plurality of unit measurements in such a manner that a sum of the overlaps of the execution times of the unit measurements using different MRM transitions is minimized in each group.

14. The mass spectrometer according to claim 2, further comprising:

f) an additional execution time determiner for determining an additional execution time based on an input by an analysis operator; and g) a corrected execution time determiner for determining a corrected execution time by adding the additional execution time at least before or after the execution time slot specified for each of the plurality of MRM transitions, and for determining the corrected execution time as the execution time in the preliminary measurement.

15. The mass spectrometer according to claim 2, further comprising:

h) a preliminary measurement executer for executing each of the plurality of created preliminary measurement execution files, and for acquiring, for each of the MRM transitions, a plurality of sets of mass chromatogram data corresponding to the plurality of applied-voltage candidate values;

i) a chromatogram data presenter for presenting, to the analysis operator, a plurality of sets of mass chromatogram data acquired for each of the plurality of MRM transitions;

j) a chromatogram data selector for allowing the analysis operator to select one of the plurality of sets of mass chromatogram data for each of the MRM transitions; and k) an actual measurement execution file creator for associating, for each of the plurality of MRM transitions, the applied-voltage candidate value corresponding to the selected set of mass chromatogram data with the MRM transition concerned, to create an actual measurement execution file for executing the multiple reaction monitoring measurement.

16. A non-transitory computer readable medium recording a program for mass spectrometry used for optimizing a condition of a multiple reaction monitoring measurement performed for each of a plurality of target compounds separated from each other by a chromatograph, wherein:

the program makes a computer function as a device for performing a mass spectrometry method according to claim 10, the computer including a storage section capable of storing at least one MRM measurement condition for each of the plurality of target compounds, the MRM measurement condition specifying an MRM transition which is a combination of a precursor ion and a product ion as well as an execution time slot in which a measurement using the MRM transition is executed within an entire measurement time.

* * * * *